US009622092B2

(12) United States Patent
Lee et al.

(10) Patent No.: US 9,622,092 B2
(45) Date of Patent: *Apr. 11, 2017

(54) METHOD AND APPARATUS FOR CONTROLLING CLOUD VIRTUAL BASE STATION

(71) Applicant: Electronics and Telecommunications Research Institute, Daejeon-si (KR)

(72) Inventors: Chan Yong Lee, Daejeon (KR); Eun Seon Cho, Daejeon (KR); Hyeon Ju Oh, Daejeon (KR); Byung Han Ryu, Daejeon (KR); Nam Hoon Park, Daejeon (KR); Dong Seung Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 212 days.

This patent is subject to a terminal disclaimer.

(21) Appl. No.: 14/242,157

(22) Filed: Apr. 1, 2014

(65) Prior Publication Data
US 2014/0317260 A1 Oct. 23, 2014

(30) Foreign Application Priority Data
Apr. 19, 2013 (KR) .......................... 10-2013-0043319

(51) Int. Cl.
*G06F 15/173* (2006.01)
*H04W 24/02* (2009.01)
*G06F 9/445* (2006.01)
*H04L 12/24* (2006.01)
*H04W 88/08* (2009.01)

(52) U.S. Cl.
CPC .............. *H04W 24/02* (2013.01); *G06F 8/60* (2013.01); *H04L 41/082* (2013.01); *H04W 88/08* (2013.01)

(58) Field of Classification Search
USPC .................................. 709/223, 224, 229, 226
See application file for complete search history.

(56) References Cited

U.S. PATENT DOCUMENTS

| | | | |
|---|---|---|---|
| 2005/0193187 A1* | 9/2005 | Harada | G06F 3/0607 713/1 |
| 2011/0191477 A1* | 8/2011 | Zhang | G06F 15/173 709/226 |
| 2013/0145365 A1* | 6/2013 | Yang | G06F 9/45558 718/1 |
| 2013/0159392 A1* | 6/2013 | Huh | G06F 9/5072 709/203 |

FOREIGN PATENT DOCUMENTS

| | | |
|---|---|---|
| KR | 10-2011-0133409 | 12/2011 |
| KR | 10-2012-0070945 | 7/2012 |
| KR | 10-2012-0096741 | 8/2012 |

* cited by examiner

*Primary Examiner* — Lan-Dai T Truong
(74) *Attorney, Agent, or Firm* — Nelson Mullins Riley & Scarborough LLP (57) ABSTRACT

Disclosed are a method and apparatus for managing a cloud virtual base station system. The present invention includes setting initial resources and driving or downloading an execution file or environment file of the cloud virtual base station system and monitoring or managing a state for a failure, radio resources, or the execution file or the environment file of the cloud virtual base station system.

16 Claims, 12 Drawing Sheets

METHOD AND APPARATUS FOR CONTROLLING CLOUD VIRTUAL BASE STATION

CROSS-REFERENCE TO RELATED APPLICATION

This application claims priority to and the benefit of Korean patent application number 10-2013-0043319, filed on Apr. 19, 2013, the entire contents of which is incorporated by reference herein its entirety.

BACKGROUND OF THE INVENTION

Field of the Invention

The present invention relates to the cloud virtual base station of a mobile communication system and, more particularly, to a method and apparatus for managing a plurality of cells and service for subscribers.

Discussion of the Related Art

In a mobile communication system, it is necessary to automatically configure, monitor, and manage cloud virtual base station systems for controlling a plurality of cells in order to reduce a maintenance and repair cost related to the operation of an operator. In order to support the configuration, monitoring, and management, there is a need for a method and apparatus for controlling cloud virtual base stations.

SUMMARY OF THE INVENTION

An object of the present invention is to provide the internal elements of a cloud virtual base station system and a cloud virtual base station management system.

Another object of the present invention is to provide a control method and apparatus within a cloud virtual base station system.

Yet another object of the present invention is to provide a control method and apparatus within a cloud virtual base station management system.

In accordance with an aspect of the present invention, a cloud virtual base station management system managing at least one cloud virtual base station system includes an initialization and loader unit configured to set initial resources and drive or download the execution files or environment files of the cloud virtual base station system, a state management unit configured to monitor or manage a state for a failure, radio resources, or the execution file or the environment file of the cloud virtual base station system, a configuration management unit driven by the initialization and loader unit and configured to manage configuration information or operation information about the activation or deactivation of a HW shape, blocking or the release of blocking, the addition or deletion of a HW shape, and a change of parameters for the cloud virtual base station system, a mode control unit driven by the initialization and loader unit and configured to control the cloud virtual base station system in a specific mode, an information management unit driven by the initialization and loader unit and configured to manage HW information, file information, or control information about the initialization and loader unit, the state management unit, the configuration management unit, or the mode control unit, and a file management unit driven by the initialization and loader unit and configured to manage the execution files or the environment files by a module.

In accordance with another aspect of the present invention, a method of a cloud virtual base station management system managing at least one cloud virtual base station system includes a target initialization step of setting initial resources and driving or downloading execution files or environment files for each cloud virtual base station system, a state management step of monitoring or managing a state for a failure, radio resources, or the execution files or environment files of the cloud virtual base station system, a configuration management step of managing configuration information or operation information about the activation or deactivation of a HW shape, blocking or the release of blocking, the addition or deletion of a HW shape, and a change of parameters for the cloud virtual base station system, a mode control step of controlling the cloud virtual base station system in a specific mode, an information management step of managing HW information, file information, or the control information about each module of the cloud virtual base station system, and a file management step of managing the execution files or the environment files for each module of the cloud virtual base station system.

BRIEF DESCRIPTION OF THE DRAWINGS

FIGS. 8A to 11 are flowcharts illustrating an example of a method of controlling a cloud virtual base station in accordance with the present invention.

DETAILED DESCRIPTION OF THE EMBODIMENTS

Hereinafter, some embodiments of the present invention are described in detail with reference to the accompanying drawings in order for a person having ordinary skill in the art to which the present invention pertains to be able to readily implement the invention. It is to be noted the present invention may be implemented in various ways and is not limited to the following embodiments. Furthermore, in the drawings, parts not related to the present invention are omitted in order to clarify the present invention and the same or similar reference numerals are used to denote the same or similar elements.

The objects and effects of the present invention can be naturally understood or become clear by the following description, and the objects and effects of the present invention are not restricted by the following description only.

The objects, characteristics, and merits will become more apparent from the following detailed description. Furthermore, in describing the present invention, a detailed description of a known art related to the present invention will be omitted if it is deemed to make the gist of the present invention unnecessarily vague. A preferred embodiment in accordance with the present invention is described in detail below with reference to the accompanying drawings.

In accordance with the present invention, when dynamically operating a plurality of cells in a specific mode in a mobile communication system, specific cells are set in a specific mode and a cloud virtual base station system is reconfigured in software (SW). Accordingly, service for subscribers can be improved, and a maintenance and repair cost related to the operation of an operator can be reduced.

That is, a method and apparatus for controlling cloud virtual base stations for integrally managing a plurality of cells according to a specific mode and also efficiently managing services for subscribers in a mobile communication system are described in detail below with reference to the accompanying drawings.

In accordance with the present invention, cloud virtual base stations for controlling cells are classified into one or more cloud virtual base station systems and one or more cloud virtual base station management systems.

Figure 1:
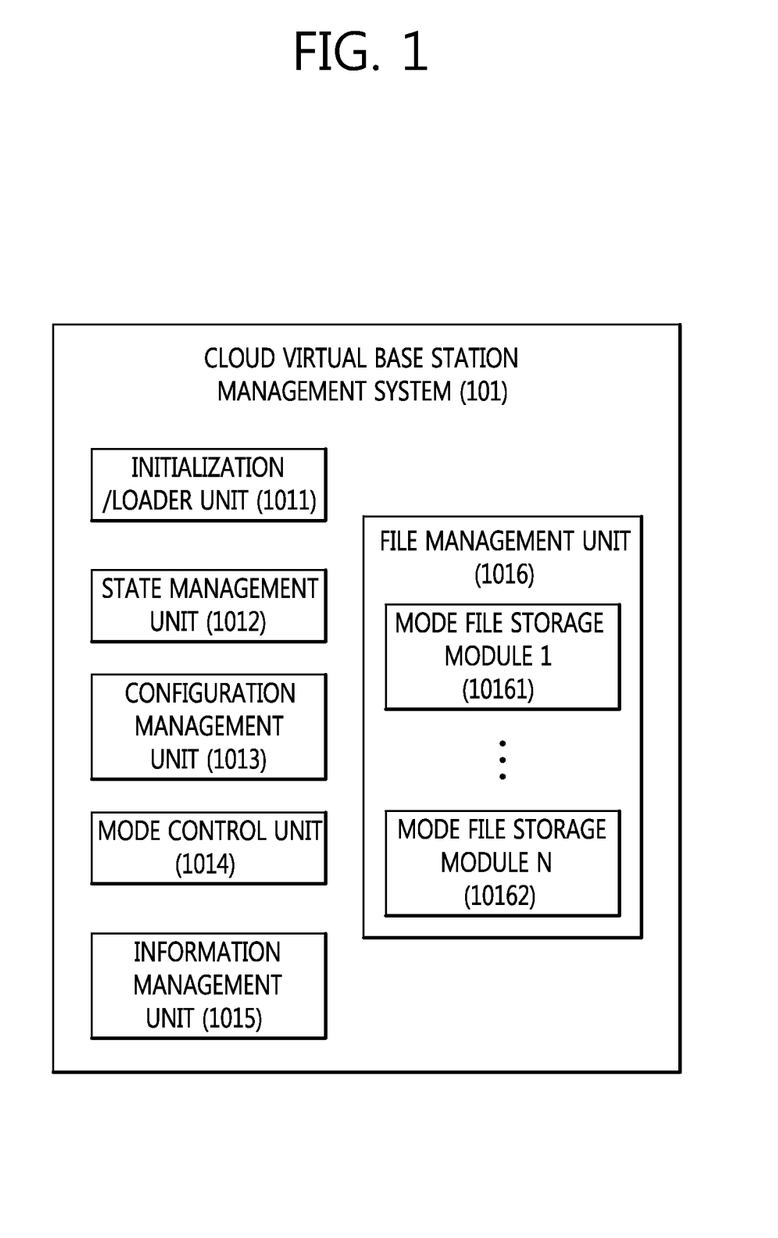
FIG. 1 is a block diagram showing an example of a cloud virtual base station management system in accordance with the present invention.

FIG. 1 is a block diagram showing an example of a cloud virtual base station management system in accordance with the present invention.

Referring to FIG. 1, the cloud virtual base station management system 101 includes an initialization/loader unit 1011, a state management unit 1012, a configuration management unit 1013, a mode control unit 1014, an information management unit 1015, and a file management unit 1016.

The initialization/loader unit 1011 operates automatically or manually and sets initial resources.

The initialization/loader unit 1011 drives necessary files. For example, the initialization/loader unit 1011 can drive files necessary for the state management unit 1012, the configuration management unit 1013, the mode control unit 1014, the information management unit 1015, and the file management unit 1016.

The initialization/loader unit 1011 downloads files (e.g., execution files and environment files) corresponding to one or more cloud virtual base station systems.

The initialization/loader unit 1011 can download files by the system while operating in conjunction with the target initialization/loader units of one or more cloud virtual base station systems.

The state management unit 1012 is driven by the initialization/loader unit 1011.

The state management unit 1012 monitors or manages the failure and radio resources of the cloud virtual base station system 101 or monitors or manages the state of driven files, while operating in conjunction with the target state management units of one or more cloud virtual base station systems.

The configuration management unit 1013 is driven by the initialization/loader unit 1011.

The configuration management unit 1013 manages information about the configuration and operation of one or more cloud virtual base station systems.

For example, the configuration management unit 1013 can activate or deactivate a hardware (HW) shape, perform blocking or release blocking, add or delete a HW shape, and change parameters for one or more cloud virtual base station systems.

The mode control unit 1014 is driven by the initialization/loader unit 1011.

The mode control unit 1014 controls one or more cloud virtual base station systems in a specific mode.

The information management unit 1015 is driven by the initialization/loader unit 1011.

The information management unit 1015 manages HW information, file information, or control information about the cloud virtual base station system of each element (e.g., the initialization/loader unit 1011, the state management unit 1012, the configuration management unit 1013, or the mode control unit 1014).

The file management unit 1016 is driven by the initialization/loader unit 1011.

The file management unit 1016 manages the files (e.g., execution files and environment files) of one or more cloud virtual base station systems, operating in a specific mode, by the module (or by the unit).

Figure 2:
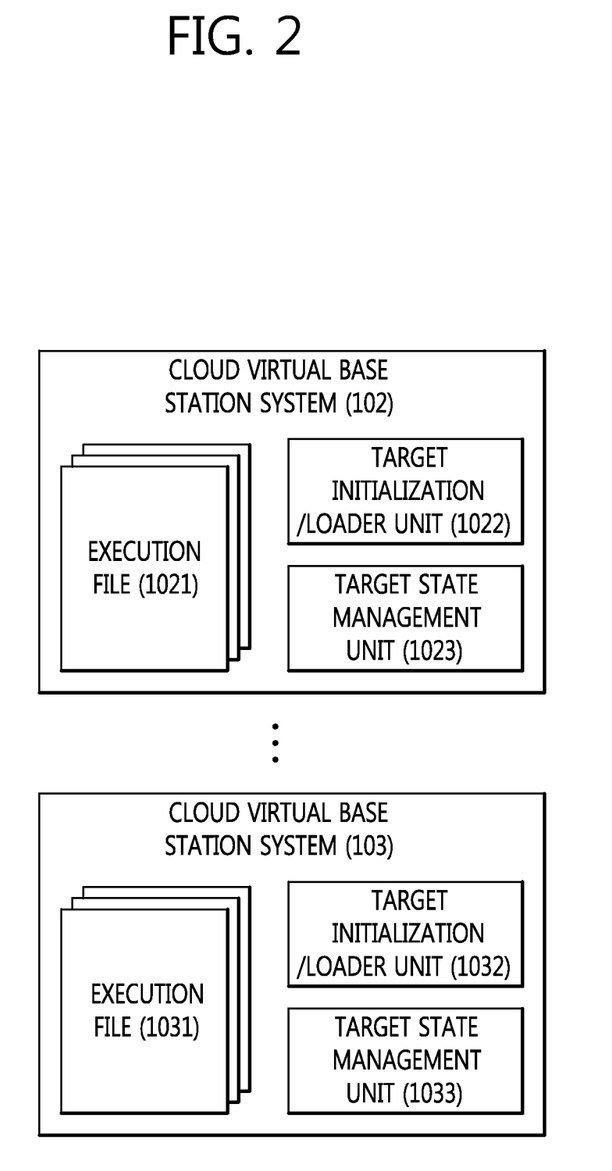
FIG. 2 is a block diagram showing an example of a cloud virtual base station system for controlling cloud virtual base stations in accordance with the present invention.

FIG. 2 is a block diagram showing an example of a cloud virtual base station system for controlling cloud virtual base stations in accordance with the present invention. One or more cloud virtual base station systems can operate at the same time.

Referring to FIG. 2, the cloud virtual base station system 102 includes one or more execution files 1021, a target initialization/loader unit 1022, and a target state management unit 1023.

Another cloud virtual base station system 103 includes one or more execution files 1031, a target initialization/loader unit 1032, or a target state management unit 1033.

The execution files 1021 and 1031 internally operate within a plurality of HW platforms in order to provide mobile communication service. The execution files 1021 and 1031 may include environment files.

The target initialization/loader units 1022 and 1032 operate automatically or manually in the respective cloud virtual base station systems, set initial resources, and drive or download necessary files (e.g., a state management unit and execution files).

The target state management units 1023 and 1033 are driven by the target initialization/loader units 1022 and 1032.

The target state management units 1023 and 1033 monitor or manage the failure and radio resources or the state of the driven files of the cloud virtual base station systems.

FIGS. 3 to 7 are block diagrams showing examples of the internal elements of a cloud virtual base station system or a cloud virtual base station management system for controlling cloud virtual base stations.

Figure 3:
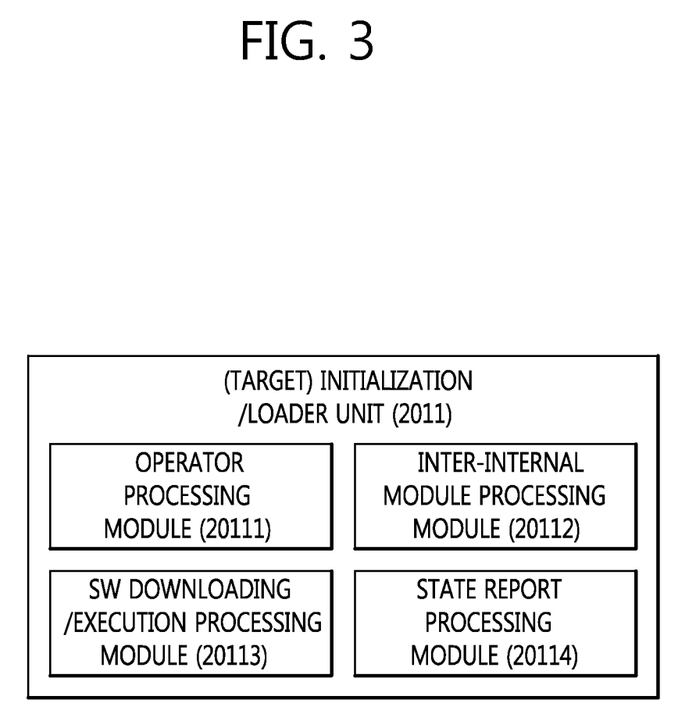
FIGS. 3 to 7 are block diagrams showing examples of the internal elements of a cloud virtual base station system or a cloud virtual base station management system for controlling cloud virtual base stations.

FIG. 3 is a block diagram showing an example of the initialization/loader unit for controlling cloud virtual base stations in accordance with the present invention.

Referring to FIG. 3, the initialization/loader unit 2011 can be the target initialization/loader unit of a cloud virtual base station system or the initialization/loader unit of a cloud virtual base station management system.

The initialization/loader unit 2011 includes an operator processing module 20111, an inter-internal module processing module 20112, a SW downloading/execution processing module 20113, and a state report processing module 20114.

The operator processing module 20111 performs functions necessary for initialization or the downloading of files (e.g., execution files and environment files) through an operator.

The inter-internal module processing module 20112 performs processing while operating in conjunction with related units (e.g., the target initialization/loader unit, the configuration management unit, the mode control unit, the state management unit, the information management unit, and the file management unit). Through the processing, the inter-internal module processing module 20112 performs processing necessary for initialization or the downloading of files (e.g., execution files and environment files) related to a specific mode.

The SW downloading/execution processing module 20113 downloads or executes files (e.g., execution files and environment files) necessary for a physical location for each cloud virtual base station system while operating in conjunction with a target initialization/loader unit.

The state report processing module 20114 manages states reported by files (e.g., the configuration management unit, the mode control unit, the state management unit, the information management unit, and the file management unit) driven in a cloud virtual base station management system. Furthermore, the state report processing module 20114 manages the failure or radio resource state of a cloud virtual base station system.

Figure 4:
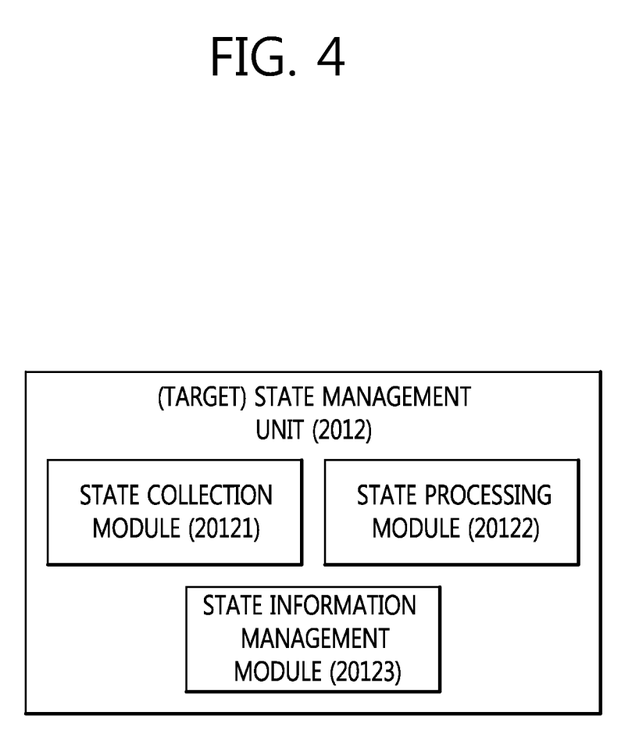

FIG. 4 is a block diagram showing an example of the state management unit for controlling cloud virtual base stations in accordance with the present invention Referring to FIG. 4, the state management unit 2012 can be the target state management unit of a cloud virtual base station system or the state management unit of a cloud virtual base station management system.

The state management unit 2012 includes a state collection module 20121, a state processing module 20122, and a state information management module 20123.

The state collection module 20121 collects driven files, HW states, and failure and radio resource states.

The state processing module 20122 processes proper processing when a driven file a HW state, a failure, or a radio resource state is generated.

The state information management module 20123 stores related information (e.g., state information) when a driven file, a HW state, a failure, or a radio resource state is generated.

Figure 5:
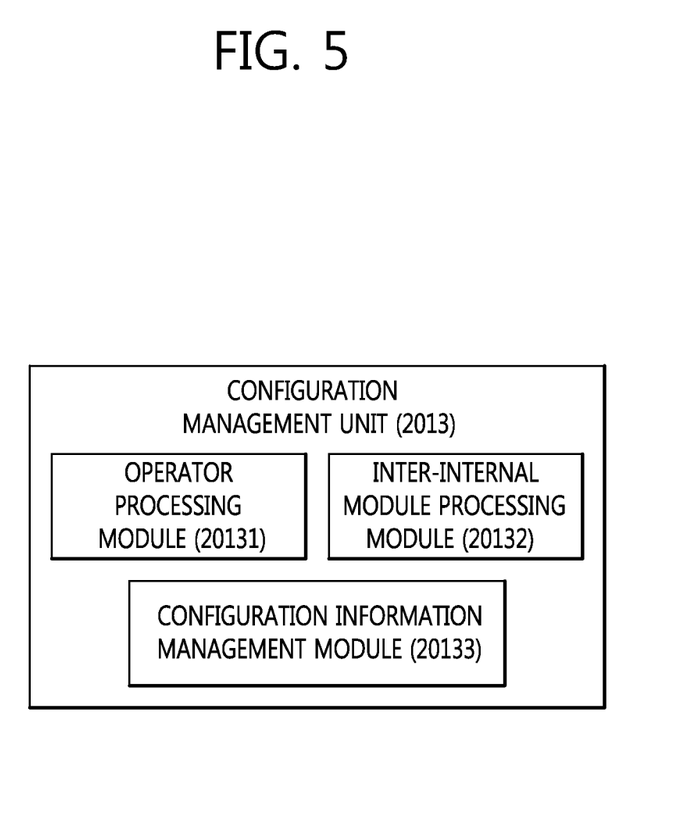

FIG. 5 is a block diagram showing an example of the configuration management unit for controlling cloud virtual base stations in accordance with the present invention.

Referring to FIG. 5, the configuration management unit 2013 includes an operator processing module 20131, an inter-internal module processing module 20132, and a configuration information management module 20133.

The operator processing module 20131 processes information about the configuration or operation of a cloud virtual base station system through an operator.

For example, the operator processing module 20131 can process configuration information or operation information for activating or deactivating a HW shape, performing blocking or releasing blocking, adding or deleting a HW shape, and changing parameters for a cloud virtual base station system through an operator.

The inter-internal module processing module 20132 performs interoperability processing between related units (e.g., the initialization/loader unit, the mode control unit, the state management unit, the information management unit, and the file management unit) for the operation of the operator processing module 20131.

The configuration information management module 20133 manages information about the configuration or operation of a cloud virtual base station system through an operator.

For example, the configuration information management module 20133 can manage configuration information or operation information for activating or deactivating a HW shape, performing blocking or releasing blocking, adding or deleting a HW shape, and changing parameters for a cloud virtual base station system through an operator.

Figure 6:
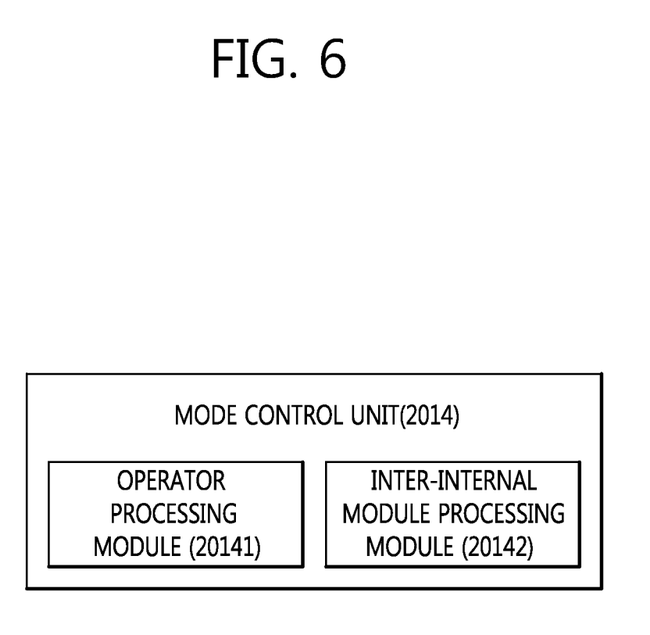

FIG. 6 is a block diagram showing an example of the mode control unit for controlling cloud virtual base stations in accordance with the present invention.

Referring to FIG. 6, the mode control unit 2014 includes an operator processing module 20141 and an inter-internal module processing module 20142.

The operator processing module 20141 configures and processes a file (e.g., SW) related to a specific mode of the cloud virtual base station system.

The inter-internal module processing module 20142 performs interoperability processing between related units (e.g., the initialization/loader unit, the configuration management unit, the state management unit, the information management unit, and the file management unit) for the processing operation of an operator processing module.

Figure 7:
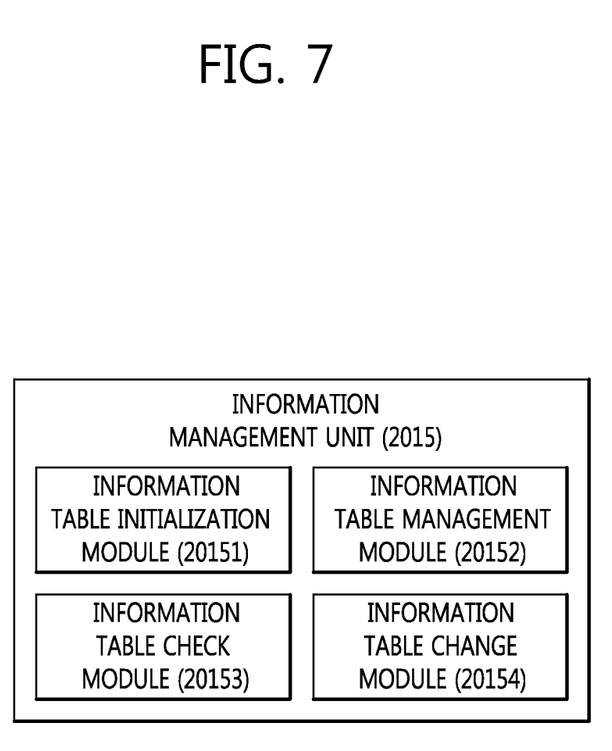

FIG. 7 is a block diagram showing an example of the information management unit for controlling cloud virtual base stations in accordance with the present invention.

Referring to FIG. 7, the information management unit 2015 includes an information table initialization module 20151, an information table management module 20152, an information table check module 20153, and an information table change module 20154.

The information table initialization module 20151 configures an initialization data table for related units (e.g., the initialization/loader unit, the configuration management unit, the state management unit, and the mode control unit).

The information table management module 20152 generates or deletes a data table.

The information table check module 20153 checks information about a data table.

The information table change module 20154 changes information about a data table.

FIGS. 8A to 11 are flowcharts illustrating an example of a method of controlling a cloud virtual base station in accordance with the present invention.

Figure 8A:
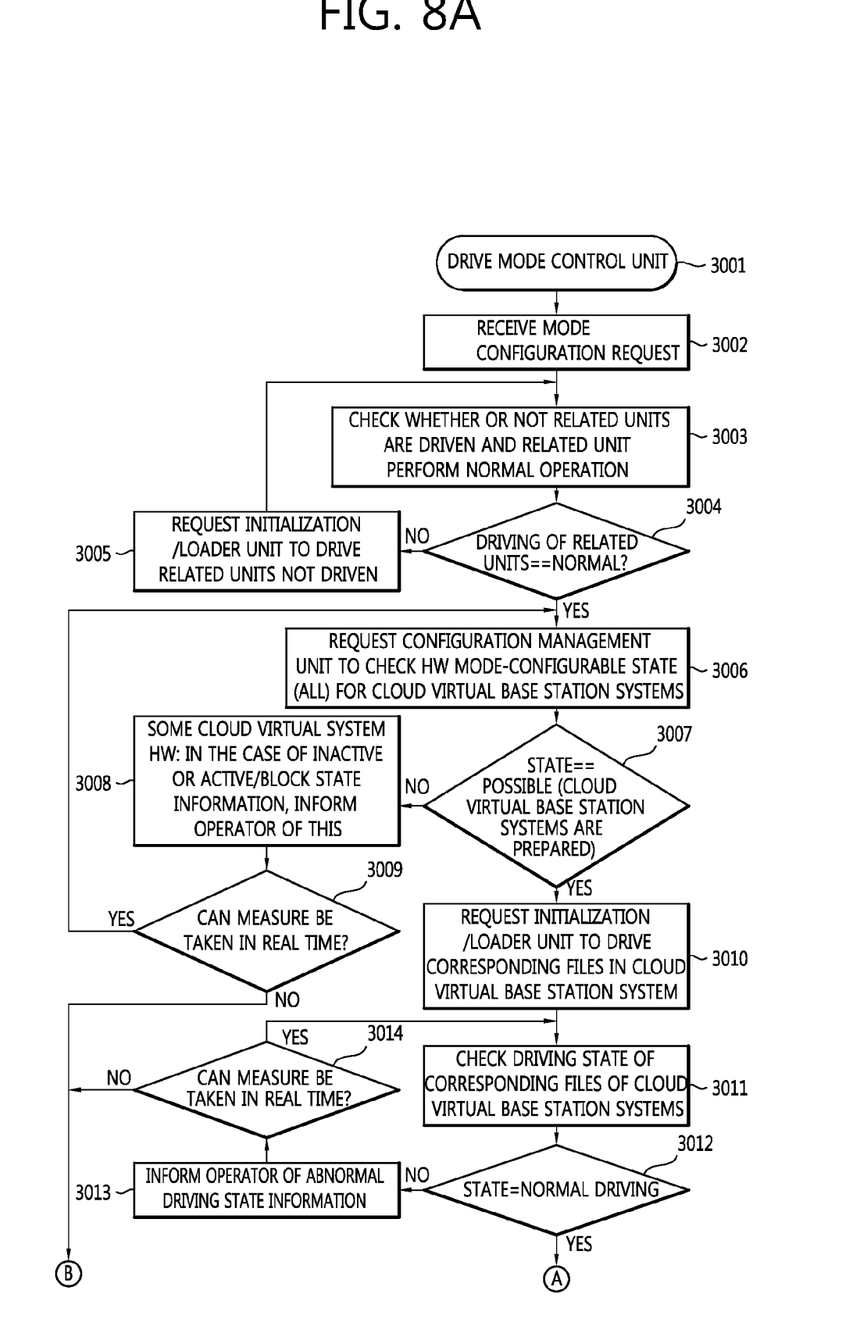
Figure 8B:
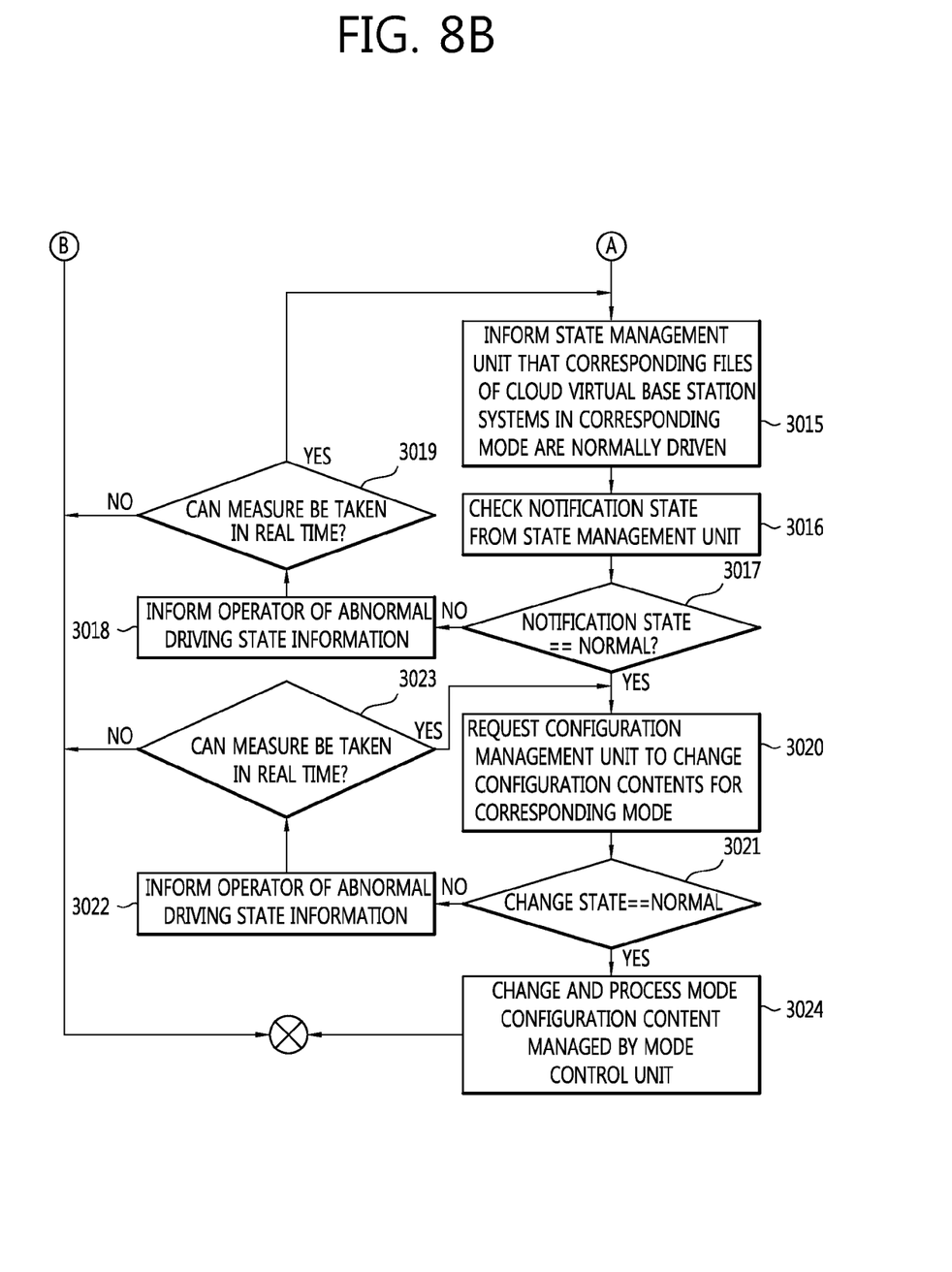

FIG. 8A and FIG. 8B show an example of a method of configuring a file (e.g., SW) related to a specific mode of a cloud virtual base station system in accordance with the present invention. The example of FIG. 8A and FIG. 8B shows a case where the mode control unit operates.

Referring to FIG. 8A and FIG. 8B, a cloud virtual base station management system drives the mode control unit at step 3001.

Next, the cloud virtual base station management system receives a mode configuration request for configuring a file (e.g., SW) related to a specific mode of a cloud virtual base station system from an operator at step 3002. Here, the cloud virtual base station management system may receive the mode configuration request automatically.

Next, the cloud virtual base station management system checks whether or not related units (e.g., the initialization/loader unit, the configuration management unit, the information management unit, the corresponding target initialization/loader unit, and the corresponding target state management unit) necessary to configure the file (e.g., SW) normally operate. To this end, the cloud virtual base station management system checks whether or not the related units are driven in the state management unit and the related units perform a normal operation at step 3003.

Next, the cloud virtual base station management system determines whether or not all the related units are driven at step 3004.

If, as a result of the determination at step 3004, it is determined that some or all of the related units are not driven, the cloud virtual base station management system requests the initialization/loader unit or a corresponding target initialization/loader unit to drive related units not driven within the cloud virtual base station system or the cloud virtual base station management system at step 3005. That is, the cloud virtual base station management system informs the cloud virtual base station system or the cloud virtual base station management system of its driving state. Next, the process returns to the step 3003.

If, as a result of the determination at step 3004, it is determined that all the related units are not driven, the cloud virtual base station management system requests the configuration management unit to check the entire HW mode-configurable state for corresponding cloud virtual base station systems at step 3006. This step is for determining whether or not a current physical location can be used by checking a received physical location of a cloud virtual base station system.

Next, the cloud virtual base station management system determines whether or not the entire HW mode configuration for corresponding cloud virtual base station systems is possible based on information from the configuration management unit at step 3007.

If, as a result of the determination at step 3007, it is determined that the state of the HW of some or all of cloud virtual systems is an inactive state or the HW of some or all of the cloud virtual systems cannot be configured because the state of the HW is a block state, the cloud virtual base station management system informs an operator or a system, managed by the operator, of this situation at step 3008.

The cloud virtual base station management system determines whether or not a measure can be taken in real time by the operator or the system managed by the operator at step 3009.

If, as a result of the determination at step 3009, it is determined that a measure can be taken in real time, the process returns to the step 3006.

However, if, as a result of the determination at step 3009, it is determined that a measure cannot be taken in real time, the cloud virtual base station management system terminates the process or informs the operator of this situation so that the operator can solve a problem for reason of the notification.

If, as a result of the determination at step 3007, it is determined that the state of the HW of all of the cloud virtual systems is an active state or the HW of all of the cloud virtual systems can be configured because the state of the HW is a block release state, the cloud virtual base station management system requests the initialization/loader unit to drive corresponding files that are present in all cloud virtual base station systems related to a corresponding mode at step 3010.

Next, the cloud virtual base station management system checks the driving state of the corresponding files of the cloud virtual base station systems in the corresponding mode that has been received from the initialization/loader unit at step 3011.

Next, the cloud virtual base station management system determines whether or not the driving state of the corresponding files is normal at step 3012.

If, as a result of the determination at step 3012, it is determined that some or all of the corresponding files are not normally driven, the cloud virtual base station management system informs an operator or a system, managed by the operator, of abnormal driving state information at step 3013.

Next, the cloud virtual base station management system determines whether or not a measure can be taken in real time by the operator or the system managed by the operator at step 3014.

If, as a result of the determination at step 3014, it is determined that a measure can be taken in real time, the process returns to the step 3011.

If, as a result of the determination at step 3014, it is determined that a measure cannot be taken in real time, the cloud virtual base station management system terminates the process or informs the operator of this situation so that the operator can solve a problem for reason of the notification.

If, as a result of the determination at step 3012, it is determined that all the corresponding files are normally driven, the cloud virtual base station management system informs the state management unit that the corresponding files of the cloud virtual base station systems in the corresponding mode are normally driven at step 3015.

Next, the cloud virtual base station management system checks a notification state received from the state management unit at step 3016.

Next, the cloud virtual base station management system determines whether or not the notification state is normal at step 3017.

If, as a result of the determination at step 3017, it is determined that the notification state for some or all of the driven files is an abnormal state, the cloud virtual base station management system informs an operator or a system, managed by the operator, of the abnormal notification state information at step 3018.

Next, the cloud virtual base station management system determines whether or not a measure can be taken in real time by an operator or a system managed by the operator at step 3019.

If, as a result of the determination at step 3019, it is determined that a measure can be taken in real time, the process returns to the step 3015.

If, as a result of the determination at step 3019, it is determined that a measure cannot be taken in real time, the cloud virtual base station management system terminates the process or informs the operator of this situation so that the operator can solve a problem for reason of the notification.

If, as a result of the determination at step 3017, it is determined that the notification state for all the driven files is an abnormal state, the cloud virtual base station management system requests the configuration management unit to change configuration contents related to the files all the cloud virtual systems for the corresponding mode at step 3020.

Next, the cloud virtual base station management system determines whether or not the change state is normal at step 3021.

If, as a result of the determination at step 3021, it is determined that the change state for some or all of the driven files is an abnormal state, the cloud virtual base station management system informs an operator or a system, managed by the operator, of the abnormal change state information at step 3022.

Next, the cloud virtual base station management system determines whether or not a measure can be taken in real time by the operator or the system managed by the operator at step 3023.

If, as a result of the determination at step 3023, it is determined that a measure can be taken in real time, the process returns to the step 3020.

If, as a result of the determination at step 3023, it is determined that a measure cannot be taken in real time, the cloud virtual base station management system terminates the process or informs the operator of this situation so that the operator can solve a problem for reason of the notification.

If, as a result of the determination at step 3021, it is determined that the change state for all the driven files is a normal state, the cloud virtual base station management system normally changes and processes mode configuration contents managed by the mode control unit and terminates the process at step 3024.

Figure 9:
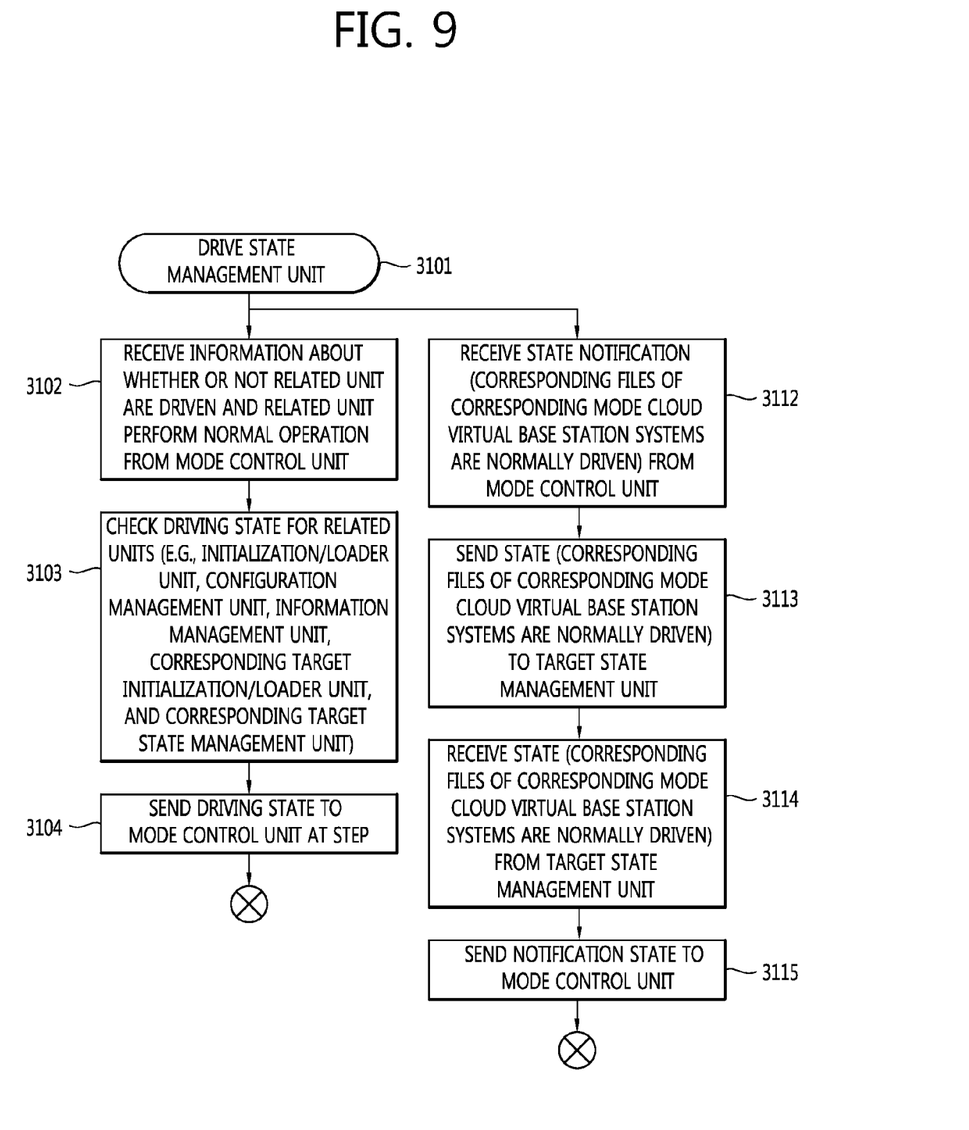

FIG. 9 shows an example of a state management method related to a specific mode of the cloud virtual base station system in accordance with the present invention.

Referring to FIG. 9, the cloud virtual base station system drives the state management unit at step 3101.

Next, the cloud virtual base station system receives information about whether or not related units are driven and the related units perform a normal operation from the mode control unit at step 3102.

Next, the cloud virtual base station system checks the driving state for the related units (e.g., the initialization/loader unit, the configuration management unit, the information management unit, a corresponding target initialization/loader unit, and a corresponding target state management unit) at step 3103.

Next, the cloud virtual base station system sends the driving state for the related units (e.g., the initialization/loader unit, the configuration management unit, the information management unit, the corresponding target initialization/loader unit, and the corresponding target state management unit) to the mode control unit at step 3104.

Another example of the state management method related to a specific mode of the cloud virtual base station system in accordance with the present invention is described below with reference to FIG. 9.

The cloud virtual base station system drives the state management unit at step 3101.

Next, the cloud virtual base station system receives state notification (meaning that the corresponding files of a corresponding mode cloud virtual base station systems are normally driven) from the mode control unit at step 3112.

Next, the cloud virtual base station system sends the state (e.g., the state indicates that the corresponding files of corresponding mode cloud virtual base station systems are normally driven) to the target state management unit at step 3113.

Next, the cloud virtual base station system receives the state (e.g., the state indicates that the corresponding files of corresponding mode cloud virtual base station systems are normally driven) from the target state management unit at step 3114.

Next, the cloud virtual base station system sends the notification state to the mode control unit at step 3115.

Figure 10:
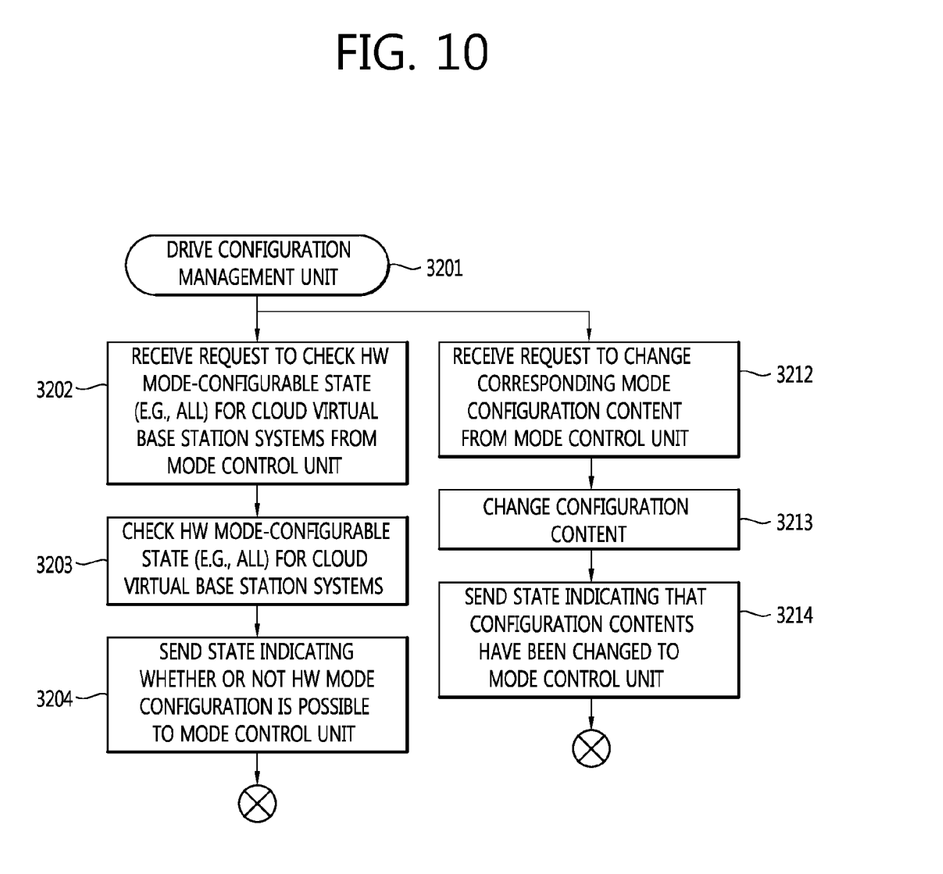

FIG. 10 shows an example of a configuration management method related to a specific mode of the cloud virtual base station system in accordance with the present invention.

Referring to FIG. 10, the cloud virtual base station system drives the configuration management unit at step 3201.

Next, the cloud virtual base station system receives a request to check a HW mode-configurable state (e.g., all) for cloud virtual base station systems from the mode control unit at step 3202.

Next, the cloud virtual base station system checks a HW mode-configurable state (e.g., all) for the cloud virtual base station systems at step 3203.

Next, the cloud virtual base station system sends a state, indicating whether or not the HW mode configuration is possible, to the mode control unit at step 3204.

Another example of the configuration management method related to a specific mode of the cloud virtual base station system in accordance with the present invention is described below with reference to FIG. 10.

The cloud virtual base station system drives the configuration management unit is driven at step 3201.

Next, the cloud virtual base station system receives a request to change corresponding mode configuration contents from the mode control unit at step 3212.

The cloud virtual base station system changes the configuration contents at step 3213.

The cloud virtual base station system sends a state, indicating that the configuration contents have been changed, to the mode control unit at step 3214.

Figure 11:
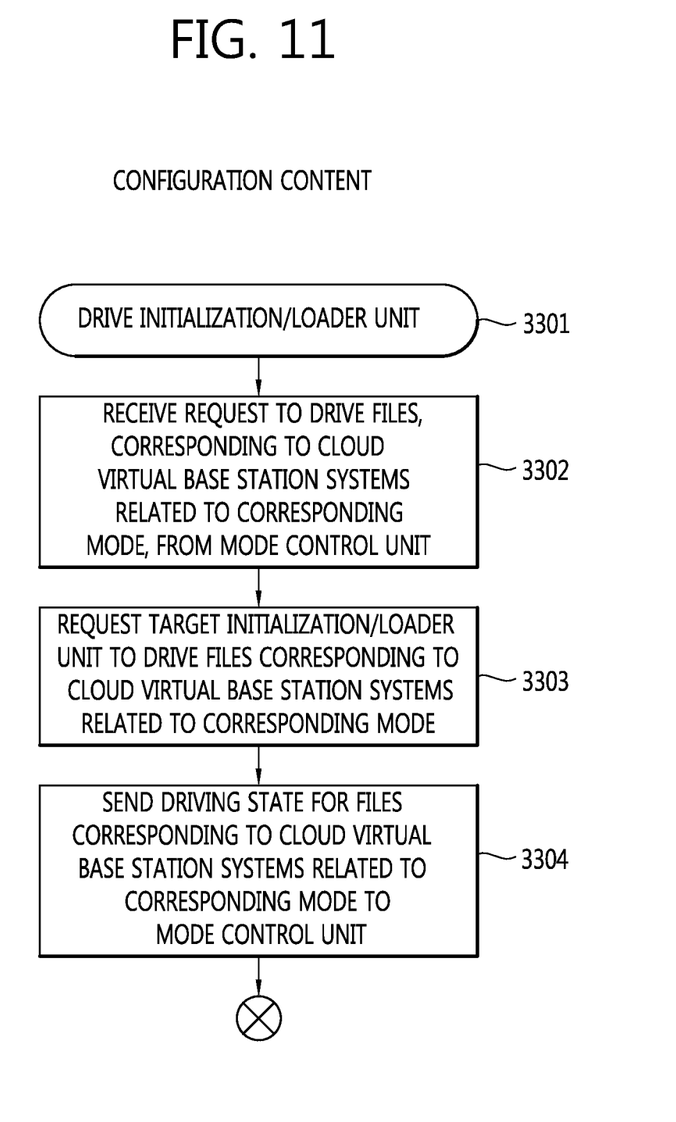

FIG. 11 shows an example of an initialization/loading method related to a specific mode of the cloud virtual base station system in accordance with the present invention.

Referring to FIG. 11, the cloud virtual base station system drives the initialization/loader unit at step 3301.

The cloud virtual base station system receives a request to drive files, corresponding to cloud virtual base station systems related to a corresponding mode, from the mode control unit at step 3302.

The cloud virtual base station system requests a target initialization/loader unit to drive the files corresponding to the cloud virtual base station systems related to the corresponding mode at step 3303.

The cloud virtual base station system sends a driving state for the files corresponding to the cloud virtual base station systems related to the corresponding mode to the mode control unit at step 3304.

In accordance with the present invention, a cost for the operation and maintenance and repair of a cloud virtual base station can be reduced.

In accordance with the present invention, there are advantages in that service for subscribers can be satisfied a maintenance and repair cost related to the operation of an operator can be reduced.

A person having ordinary skill in the art to which the present invention pertains may change and modify the present invention in various ways without departing from the technical spirit of the present invention. Accordingly, the present invention is not limited to the above-described embodiments and the accompanying drawings.

In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

What is claimed is:

1. A cloud virtual base station management system managing at least one cloud virtual base station system, comprising:
   a hardware platform in a mobile communication system configured to:
   set, by an initialization and loader unit, initial resources and drive or download execution files or environment files of the cloud virtual base station system;
   monitor or manage, by a state management unit, a state for a failure, radio resources, or the execution files or the environment files of the cloud virtual base station system;
   control, by a mode control unit driven by the initialization and loader unit, the cloud virtual base station system in a specific mode,
   wherein the mode control unit measures driving state information in real time, and wherein, if the driving state information indicates all driving files are in an abnormal state, the mode control unit changes configuration contents relating to the driving files for the specific mode.

2. The cloud virtual base station management system of claim 1, wherein the execution files or the environment files operates within a HW platform and performs operations related to mobile communication service.

3. The cloud virtual base station management system of claim 2, further comprising a configuration management unit driven by the initialization and loader unit and configured to manage configuration information or operation information about an activation or deactivation of a HW shape, blocking or a release of blocking, an addition or deletion of a HW shape, and a change of parameters for the cloud virtual base station system.

4. The cloud virtual base station management system of claim 1, further comprising an information management unit driven by the initialization and loader unit and configured to manage HW information, file information, or control information about the initialization and loader unit, the state management unit, the configuration management unit, or the mode control unit.

5. The cloud virtual base station management system of claim 4, further comprising a file management unit driven by the initialization and loader unit and configured to manage the execution files or the environment files by a module.

6. The cloud virtual base station management system of claim 5, wherein the initialization and loader unit comprises:
   an operator processing module for performing an initialization operation through an operator;
   an inter-internal module processing module for performing interoperability processing between the configuration management unit, the mode control unit, the state management unit, the information management unit, and the file management unit;
   a SW downloading and execution processing module for downloading or executing files necessary for a physical location of the cloud virtual base station system while operating in conjunction with the cloud virtual base station system; and
   a state report processing module for managing a state reported by the cloud virtual base station system or managing the failure or radio resource state of the cloud virtual base station system.

7. The cloud virtual base station management system of claim 5, wherein the state management unit comprises:
   a state collection module for collecting driven files, a HW state, a failure state, or a radio resource state;
   a state processing module for performing processing when the HW state, failure state, or radio resource state is generated; and
   a state information management module for storing information related to the driven files, the HW state, the failure state, or the radio resource state.

8. The cloud virtual base station management system of claim 5, wherein the state management unit comprises:
   an operator processing module for configuring or operating the activation or deactivation of a HW shape, blocking or the release of blocking, the addition or deletion of a HW shape, and the change of parameters for the cloud virtual base station system through an operator;
   an inter-internal module processing module for performing the interoperability processing between the initialization and loader unit, the mode control unit, the state management unit, the information management unit, and the file management unit for the configuration or operation; and
   a configuration information management module for managing information related to the configuration or operation.

9. The cloud virtual base station management system of claim 5, wherein the mode control unit comprises:
   an operator processing module for configuring or processing files related to the specific mode of the cloud virtual base station system; and
   an inter-internal module processing module for performing interoperability processing between the initialization and loader unit, the configuration management unit, the state management unit, the information management unit, and the file management unit.

10. The cloud virtual base station management system of claim 5, wherein the information management unit comprises:
    an information table initialization module for initializing and configuring a data table;
    an information table management module for generating or deleting the data table;
    an information table check module for checking information about the data table; and
    an information table change module for changing the information about the data table.

11. A method of a cloud virtual base station management system managing at least one cloud virtual base station system, comprising:
    a target initialization step of setting initial resources and driving or downloading execution files or environment files for each cloud virtual base station system;
    a state management step of monitoring or managing a state for a failure, radio resources, or the execution files or environment files of the cloud virtual base station system;
    a configuration management step of managing configuration information or operation information about an activation or deactivation of a HW shape, blocking or a release of blocking, an addition or deletion of a HW shape, and a change of parameters for the cloud virtual base station system;
    a mode control step of controlling the cloud virtual base station system in a specific mode;
    an information management step of managing HW information, file information, or the control information about each module of the cloud virtual base station system; and
    a file management step of managing the execution files or the environment files for each module of the cloud virtual base station system,
    wherein the mode control step comprises steps of:
      receiving a mode configuration request from an operator;
      checking whether or not each module of the cloud virtual base station system performs a normal operation;
      requesting to check a HW mode-configurable state of the cloud virtual base station system;
      requesting to drive files related to the HW mode;
      determining whether or not a driving state is normal by checking the driving state of the files related to the HW mode;
      informing that the files related to the HW mode are normally driven;

requesting to change configuration contents of the files related to the HW mode; and terminating the change of the configuration contents if a change state of the driven files is a normal state.

12. The method of claim 11, wherein the state management step comprises steps of:

receiving information indicative of whether or not each module of the cloud virtual management base station system is driven and each module performs a normal operation;

checking a driving state of each module; and sending the driving state of each module.

13. The method of claim 11, wherein the state management step comprises steps of:

receiving a state indicating that files of the cloud virtual base station system in the specific mode are normally driven; and sending the state indicating that the files of the cloud virtual base station system in the specific mode are normally driven.

14. The method of claim 11, wherein the configuration management step comprises steps of:

receiving a request to check a HW mode-configurable state for the cloud virtual base station system;

checking the configurable state; and sending the configurable state.

15. The method of claim 11, wherein the configuration management step comprises steps of:

receiving a request to change mode configuration contents;

changing the mode configuration contents; and sending the change state.

16. The method of claim 11, wherein the target initialization step comprises steps of:

receiving a request to drive files for the cloud virtual base station system;

making a request to drive the files; and sending a driving state of the files.

* * * * *